United States Patent
Holemans et al.

(10) Patent No.: US 10,053,203 B2
(45) Date of Patent: Aug. 21, 2018

(54) COMPOSITE STIFFENER WITH INTEGRAL CONDUCTIVE ELEMENT

(71) Applicant: The Boeing Company, Chicago, IL (US)

(72) Inventors: Peter Holemans, Sewell, NJ (US); Matthew Stauffer, Bridgeport, PA (US)

(73) Assignee: The Boeing Company, Chicago, IL (US)

( * ) Notice: Subject to any disclaimer, the term of this patent is extended or adjusted under 35 U.S.C. 154(b) by 198 days.

(21) Appl. No.: 14/881,530

(22) Filed: Oct. 13, 2015

(65) Prior Publication Data

US 2017/0101168 A1    Apr. 13, 2017

(51) Int. Cl.
| | |
|---|---|
| *B64C 1/12* | (2006.01) |
| *B64C 1/06* | (2006.01) |
| *B64D 45/02* | (2006.01) |
| *B64C 1/00* | (2006.01) |

(52) U.S. Cl.
CPC .............. *B64C 1/064* (2013.01); *B64C 1/12* (2013.01); *B64D 45/02* (2013.01); *B64C 2001/0072* (2013.01); *B64D 2221/00* (2013.01)

(58) Field of Classification Search
CPC ............ B64C 1/064; B64C 1/12; B64D 45/02
See application file for complete search history.

(56) References Cited

U.S. PATENT DOCUMENTS

| | | | | |
|---|---|---|---|---|
| 4,531,695 A * | 7/1985 | Swinfield | ................ | B64C 1/068 244/119 |
| 4,635,882 A * | 1/1987 | SenGupta | ................ | B64C 1/06 188/378 |
| 5,307,601 A * | 5/1994 | McCracken | .............. | E04C 3/07 249/18 |
| 6,632,502 B1 * | 10/2003 | Allen | ................... | B29C 70/446 428/119 |
| 7,014,143 B2 * | 3/2006 | Pham | .................... | B64D 45/02 244/10 |
| 7,074,474 B2 * | 7/2006 | Toi | ....................... | B29C 70/443 244/119 |

(Continued)

FOREIGN PATENT DOCUMENTS

| | | | | |
|---|---|---|---|---|
| WO | | 2009016093 A2 | 2/2009 | |
| WO | WO 2009016093 A2 * | | 2/2009 | ............... B64C 1/12 |

(Continued)

OTHER PUBLICATIONS

Extended European Search Report dated Feb. 15, 2017 in corresponding European Patent Application No. 16192932.8.

(Continued)

*Primary Examiner* — Justin M Benedik
(74) *Attorney, Agent, or Firm* — Ostrager Chong Flaherty & Broitman PC

(57) ABSTRACT

A composite stiffener is provided with an integral conductive element extending longitudinally through an entire length of the composite stiffener to form a portion of an electrical ground/return system in a composite structure. The integral conductive element provides both structural strength and conductivity, and may be formed from graphite nanotube filaments, carbon nanofibers or nanoparticles, or a metallic filler material. The integral conductive element is disposed in a terminal portion of the composite stiffener and may include a terminal tab for connecting to the ground/return system.

9 Claims, 9 Drawing Sheets

(56) References Cited

U.S. PATENT DOCUMENTS

| | | | | |
|---|---|---|---|---|
| 7,134,629 B2* | 11/2006 | Johnson | ............... | B61D 17/041 244/119 |
| 7,967,250 B2* | 6/2011 | Lobato | ................... | B64C 1/061 244/119 |
| 8,087,614 B2* | 1/2012 | Childs | ................... | B64C 3/182 244/119 |
| 8,746,618 B2* | 6/2014 | Brook | .................. | B29C 70/222 244/119 |
| 2007/0095982 A1* | 5/2007 | Kismarton | .............. | B29C 70/44 244/119 |
| 2008/0185478 A1* | 8/2008 | Dannenberg | .............. | B64C 1/12 244/119 |
| 2009/0283638 A1* | 11/2009 | Arevalo Rodriguez | ................... | B29D 99/0014 244/119 |
| 2010/0025529 A1* | 2/2010 | Perry | ................... | B29C 65/562 244/117 R |
| 2010/0133380 A1* | 6/2010 | Roebroeks | .............. | B32B 15/08 244/119 |
| 2010/0282905 A1* | 11/2010 | Cazeneuve | ............... | B64C 1/06 244/120 |
| 2011/0278395 A1* | 11/2011 | Telgkamp | ............. | B29C 70/088 244/119 |
| 2012/0006940 A1* | 1/2012 | Mialhe | ................... | B64C 1/068 244/117 R |
| 2012/0019973 A1* | 1/2012 | Ehrmantraut | .......... | B64D 45/02 361/218 |
| 2014/0167500 A1* | 6/2014 | Frankenberger | ....... | B64D 45/00 307/9.1 |

FOREIGN PATENT DOCUMENTS

| | | | | |
|---|---|---|---|---|
| WO | | 2011064263 A2 | 6/2011 | |
| WO | WO | 2011064263 A2 * | 6/2011 | ............. B64C 1/064 |

OTHER PUBLICATIONS

European Search Report dated Jun. 4, 2018 in corresponding European Patent Application No. 16192932.8.

* cited by examiner

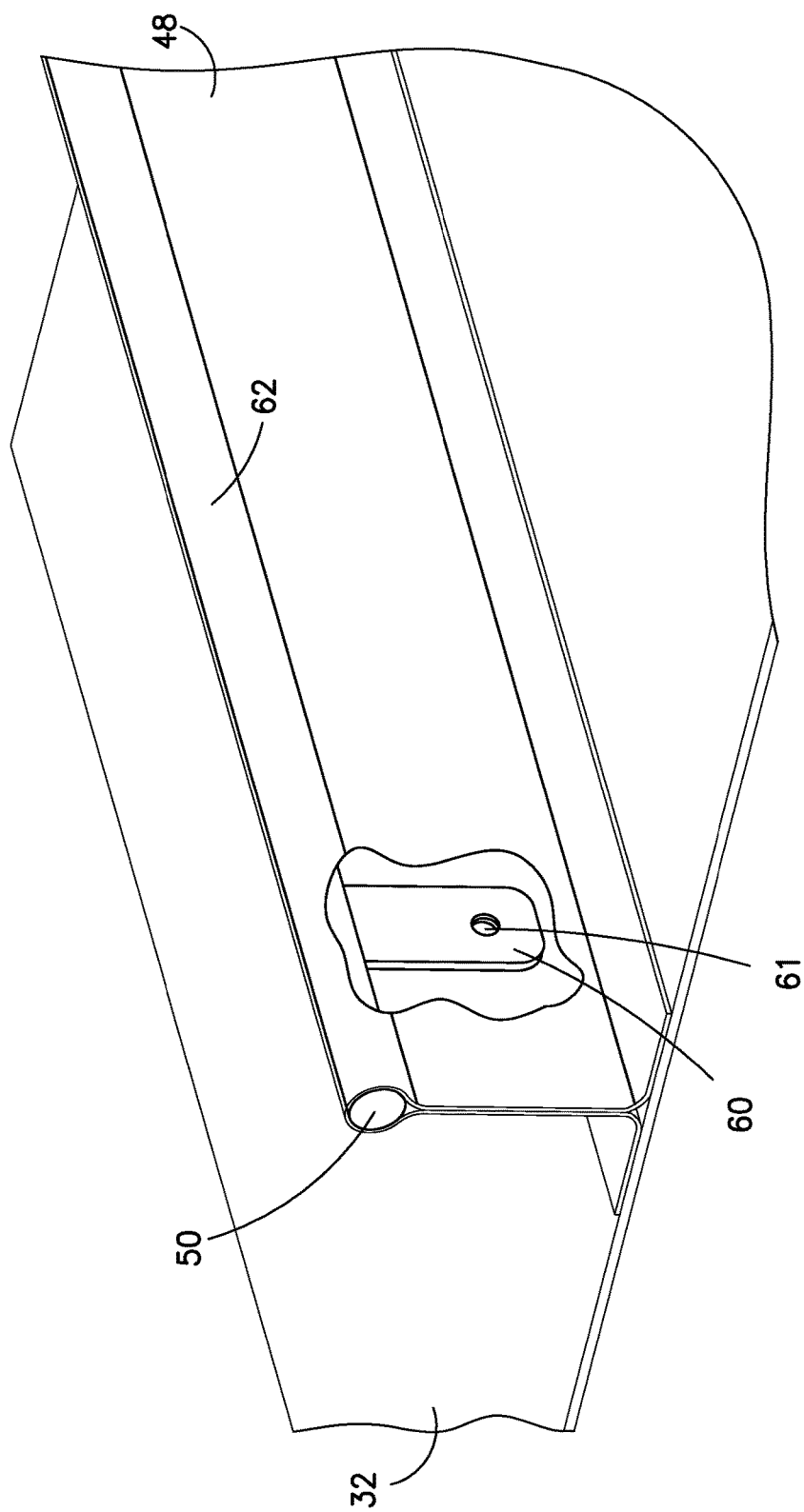

COMPOSITE STIFFENER WITH INTEGRAL CONDUCTIVE ELEMENT

TECHNICAL FIELD

This disclosure relates generally to electrical ground/return systems in composite structures such as modern aircrafts and, more particularly, to improved electrical paths for leakage or excess currents to flow to ground.

BACKGROUND

Grounding is the process of electrically connecting conductive objects, such as electronic components, power generators and other electrical equipment, to an electrical ground for the purpose of safely completing either a normal or fault electrical circuit. An electrical ground may be any electrical conductor that is able to absorb a vast amount of electrical charge and therefore serve as an escape route for dangerous buildups of current. Thus, an accidental electrical surge will flow through electrical paths to the electrical ground rather than damaging the conductive objects.

Modern aircrafts are commonly designed to utilize composite materials to form component parts (such as panels, frames, stringers or stiffeners, skins, hulls, etc.) for use in fuselages, wings, tail assemblies and other aircraft structures, and to incorporate a variety of high tech electronic components, power generators and other electrical equipment that require an electrical ground path. Composite materials provide high strength and rigidity, low weight, corrosion resistance, fuel economy and other benefits, but do not provide conductivity needed for aircraft grounding, lightning strike protection or other electrical functions.

Additional electrical provisions are therefore installed in aircrafts made from composite materials to provide these functions. For example, typical ground/return systems in aircraft made from composite structures generally include one or more discrete, large-gauge electrical wires, or bundles of wires, that may run the entire length of an aircraft to provide an electrical ground or return path for leakage currents to flow from conductive objects to a sub-structure in the aircraft where it can be grounded. Metallic mesh (aluminum, copper or other metal) may also be placed on the outside of a composite lay-up on an aircraft's outer surface for lightning strike protection as described in commonly-owned U.S. Pat. No. 7,014,143. These additional electrical provisions effectively perform the required electrical functions, but they do not provide any structural benefits, may add weight to the aircraft, and may increase manufacturing time and cost.

It is therefore desirable for aircraft with composite component parts to have an electrical ground/return system that performs at least similar functions as known electrical ground/return systems while reducing the weight of, and the manufacturing time and material cost to produce, such an electrical ground/return system.

SUMMARY

Integrating a conductive element into a composite stiffener for use in a composite structure such as an aircraft fuselage, and configuring the composite stiffener to form a portion of a ground/return system in the composite structure achieves the foregoing purposes, as well as other purposes that will be apparent. For purposes of this disclosure, a "stiffener" is any long structural member running in a lengthwise or longitudinal direction of the composite structure (i.e., from front to rear), and is sometimes referred to as a longeron or stringer when used in aircraft.

The conductive element is manufactured to be an integral part of the composite stiffener, during the manufacture of the composite stiffener, thus combining the functions of electrical ground wires and composite stiffeners into a single part. This leads to increased structural efficiency and decreased electrical assembly time as a result of the reduced number of wires that need to be bundled and installed into the aircraft. The conductive element extends longitudinally through an entire length of the composite stiffener and the aircraft fuselage to provide connection points at all locations in the aircraft. The conductive element comprises a material that provides both structural strength and conductivity, such as graphite nanotube filaments, carbon nanofibers or nanoparticles, or a metallic filler material. The conductive element is disposed in a terminal portion of the composite stiffener and, in some embodiments, comprises one or more terminal tabs that provide one or more connection points to the ground/return system in the composite structure.

In another aspect of this disclosure, a ground/return system is provided for a composite structure comprising one or more composite stiffeners having an integral conductive element extending through an entire length of the one or more composite stiffeners and forming a portion of the ground/return system.

In yet another aspect of this disclosure, an aircraft comprises a fuselage having one or more external composite skins, a series of longitudinally spaced circumferential composite frame members that define a cross-sectional shape of the fuselage, and a series of spaced composite stiffeners disposed longitudinally with respect to the fuselage that together with the frame members support the skins. At least one of the composite stiffeners comprises an integral conductive element that extends longitudinally through an entire length of the composite stiffener(s) and comprises a material that provides both structural strength and conductivity, such as graphite nanotube filaments, carbon nanofibers or nanoparticles, or a metallic filler material. The composite stiffener with the integral conductive element forms a portion of the aircraft's ground/return system.

Further areas of applicability and advantages of the disclosed composite stiffener with an integrated conductive element and associated ground/return system will become apparent when the detailed description is considered in conjunction with the following drawings. It should be understood that the detailed description and specific examples are intended for purposes of illustration only and are not intended to limit the scope of the disclosure.

BRIEF DESCRIPTION OF THE DRAWINGS

Various embodiments will be hereinafter described with reference to drawings for the purpose of illustrating the foregoing and other aspects of the disclosure.

FIG. 4B is an illustration of the integral conductive element and terminal tab integrated into the improved composite stiffener shown in FIG. 4A.

DETAILED DESCRIPTION

In the following detailed description, various embodiments of an apparatus, systems and methods for improving electrically conductive paths in a ground/return system in a composite structure are described to illustrate the general principles of the present disclosure. The disclosed apparatus, systems and methods are suitable for use in a wide variety of aircraft and aerospace applications. This disclosure is merely exemplary in nature and is in no way intended to limit the scope of the disclosed apparatus, systems and methods, their applications or their uses. It will also be immediately recognized by one skilled in the art that the present disclosure may be practiced in other analogous applications or environments and/or with other analogous or equivalent variations of the illustrative embodiments. For example, the disclosed improved composite stiffeners with integral conductive elements are just as readily adapted for use with ground-based composite vehicles or ground-based composite structures wherein the ability to safely complete either a normal or fault electrical circuit is desired, and for other types of ground/return systems. It should also be noted that those methods, procedures, components, or functions which are commonly known to persons of ordinary skill in the field of the disclosure are not described in detail herein.

Figure 1:
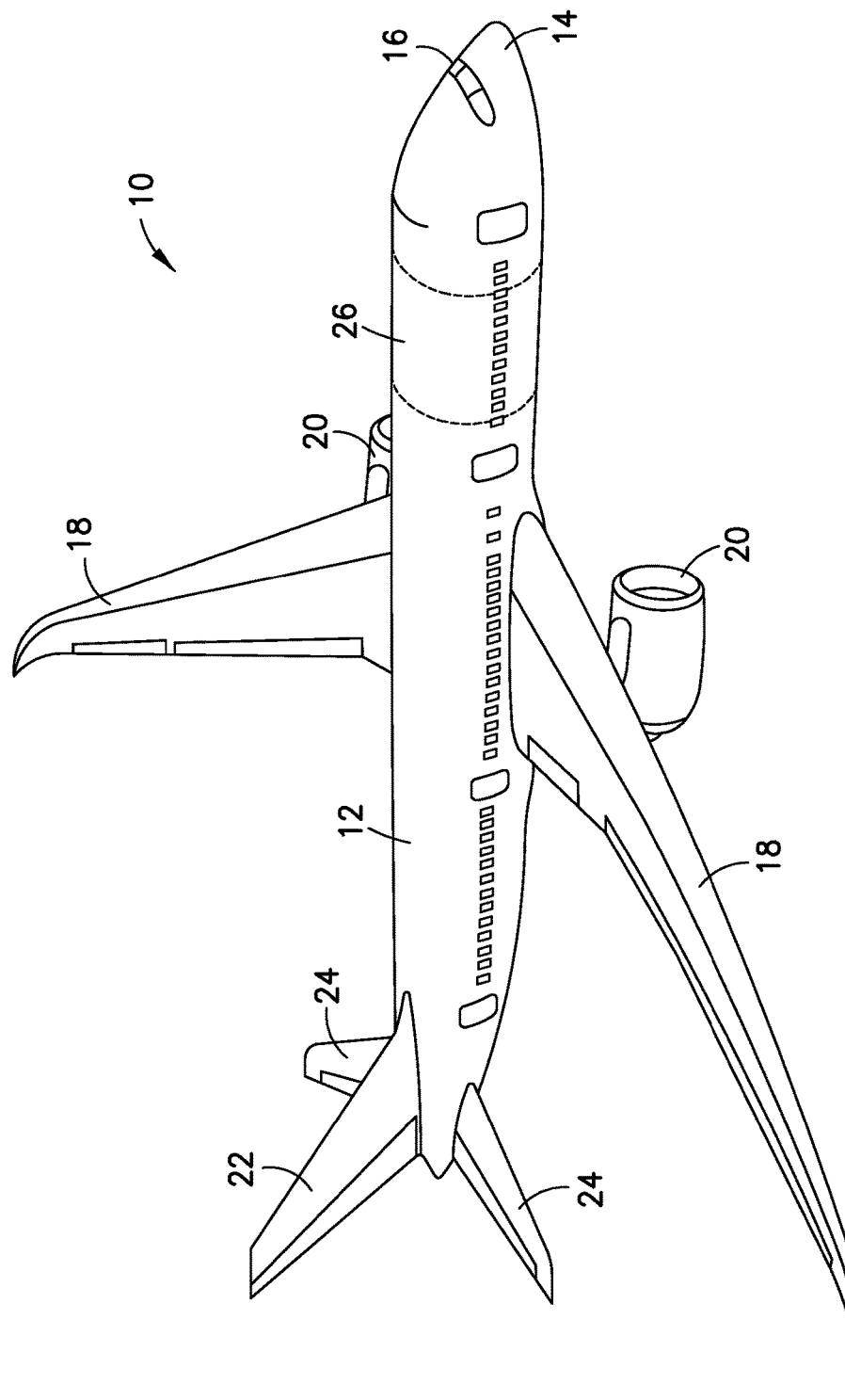
FIG. 1 is an illustration of a perspective view of an aircraft that may incorporate the disclosed improved composite stiffener with integrated conductive element.

Referring more particularly to the drawings, FIG. 1 is an illustration of a perspective view of an exemplary aircraft 10 that may incorporate the improved composite stiffener with an integral conductive element in accordance with this disclosure. The aircraft 10 comprises a fuselage 12, a nose 14, a cockpit 16, wings 18, one or more propulsion units 20, a vertical tail portion 22, and horizontal tail portions 24. Any or all of the foregoing aircraft structures may be made from composite materials. Although the aircraft 10 shown in FIG. 1 is generally representative of a commercial passenger aircraft, the teachings of the disclosed embodiments may be applied to other passenger aircraft, cargo aircraft, military aircraft, rotorcraft, and other types of aircraft or aerial vehicles, as well as satellites, space launch vehicles, rockets and other aerospace vehicles, as well as boats and other watercraft, trains, automobiles, trucks, buses, or other suitable vehicles, structures, buildings or items having composite structures.

Figure 2A:
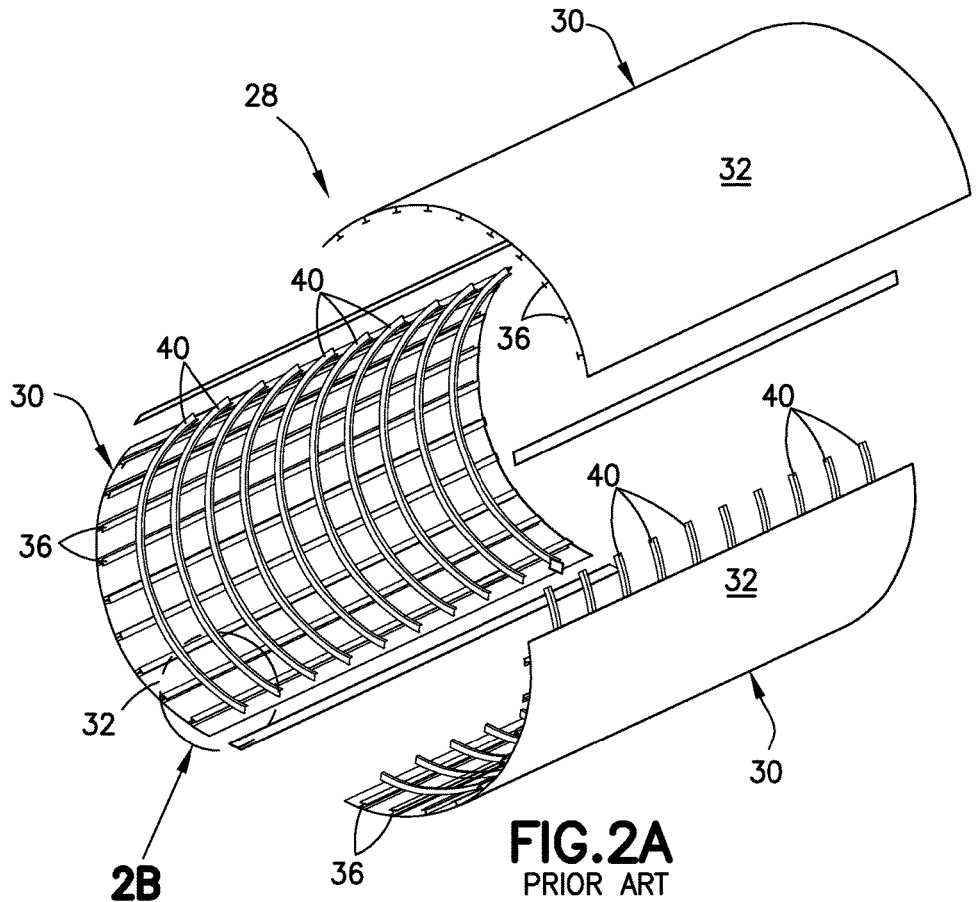
FIG. 2A is an illustration of an exploded perspective view of a prior art airframe in a section of the aircraft depicted by broken lines in FIG. 1.
Figure 2B:
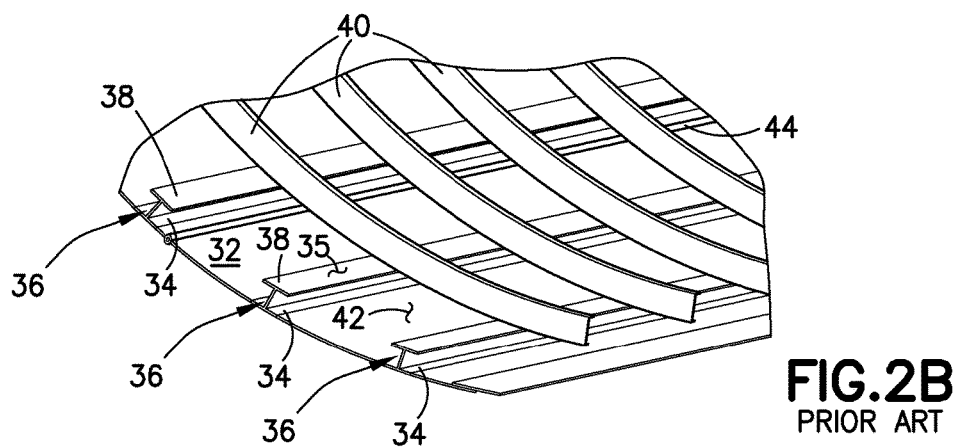
FIG. 2B is an illustration of magnified view of a section of the airframe depicted by the broken lines in FIG. 2A.
Figure 3:
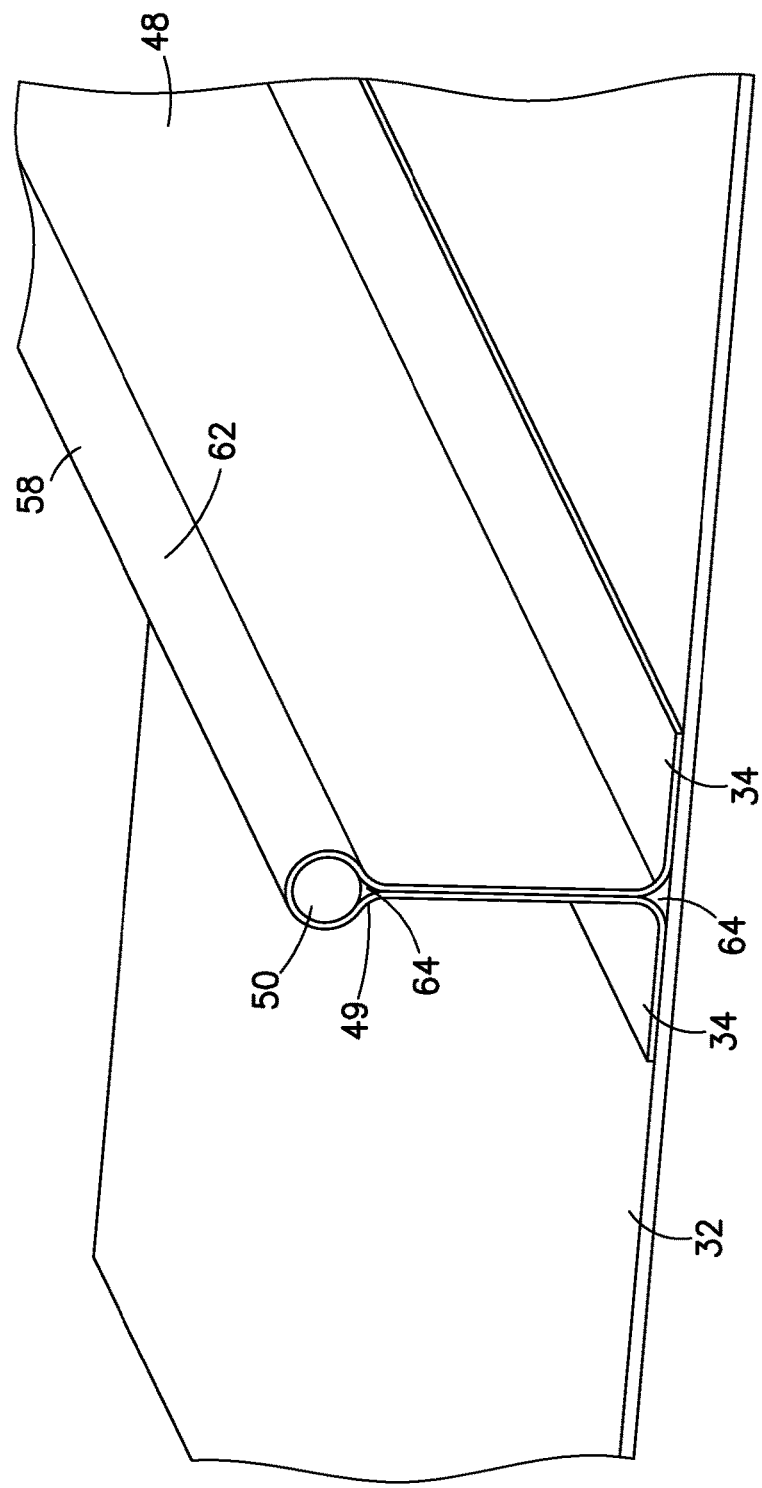
FIG. 3 is an illustration of a perspective view of one embodiment of an improved composite stiffener with integral conductive element.

An exploded view of a section 26 (indicated by dotted lines in FIG. 1) of a typical airframe 28 of the aircraft fuselage 12 is shown in FIGS. 2A and 2B. The airframe 28 is constructed of a number of conjoined structural panels 30. Each of the structural panels 30 includes an external skin 32 joined to lower flanges 34 of a plurality of longitudinal stiffeners 36 (or longerons or stringers). The longitudinal stiffeners 36 are shown here having an I-shape cross-section also including upper flanges 38 and a terminal end 35 of the longitudinal stiffeners 36. Several other types of stiffeners 36 are commonly used including stiffeners 36 having a hat-shape cross-section, J-shape cross-section, blade-shape cross-section and others. To form the airframe 28, the upper flanges 38 are joined to a plurality of circumferentially arcuate frame members 40, so that the frame members 40 are spaced radially inward relative to the external skin 32 by a dimension corresponding to a height of the longitudinal stiffeners 36. Thus, the longitudinal stiffeners 36 pass through an annular space 42 between the external skin 32 and the frame members 40. When composite materials are used to form the structural panels 30, the annular space 42 may also be used for running electrical wires and/or cables 44 through the airframe 28 of the fuselage 12 to form part of a ground/return system. Such electrical wires and/or cables 44 are typically heavy, have a large diameter, and do not provide any structural benefit to the airframe 28.

In this disclosure, one or more of the longitudinal stiffeners 36 of a typical airframe 28 are replaced with an improved composite stiffener 48, shown in FIGS. 3-6, made from composite material 49 and having an integral conductive element 50 configured to form a portion of a ground/return system 80 that connects small gauge electrical wires 52 coupled to conductive objects 54 throughout the aircraft 10 (such as electronic components, power generators and other electrical equipment) to an electrical ground 56 in the aircraft 10. In most aircraft applications, it will be sufficient to replace 3 to 4 of the longitudinal stiffeners 36 of a typical airframe 28 (FIG. 2A) with an improved composite stiffener 48 having an integral conductive element 50 to provide sufficient number of electrical paths to the electrical ground 56 in the ground/return system 80, but any number of longitudinal stiffeners 36 in an airframe 28 or other composite structure may be replaced with the improved composite stiffener 48.

The integral conductive element 50 is integrated into a terminal portion 58 of the improved composite stiffener 48 during the manufacturing process and extends longitudinally through an entire length of the improved composite stiffener 48. In some embodiments, the conductive element 50 comprises a terminal tab 60 (shown in FIG. 4B) having a connection point 61 for electrically connecting the conductive element 50 to the small gauge electrical wires 52 or to the electrical ground 56 to enable integration of the improved composite stiffener 48 into the ground/return system. The terminal tab 60 extends between two vertical walls 53 of the improved composite stiffener 48. At desired locations for integration, a typical electrical bonding nut 70 and bolt (not shown) is used to make the electrical connection. A typical electrical connection such as this is required to have no more than 2.5 milliohms across the connection.

The improved composite stiffener 48 with integral conductive element 50 will therefore simplify or substitute for currently used electrical paths (such as large gauge wires/cables 44) in ground/return systems while at the same time providing structural benefits without added weight.

The integral conductive element 50 comprises a material that provides both structural strength and conductivity, and preferably has tensile strength in the range of about 80 to about 200 ksi. The conductivity of the integral conductive element 50 should be comparable to or better than the conductivity of currently used electrical paths, and must provide adequate conductivity to accommodate normal and fault currents from the electrical systems in the aircraft, and preferably sufficient conductivity to accommodate currents generated from lightning strikes without creating excessive voltage drop or damage to the aircraft 10. Examples of suitable materials to form the conductive element 50 include graphite nanotube filaments, carbon nanofibers or nanoparticles, a metallic filler material such as aluminum or titanium, or a non-metallic, composite material that contains a sufficient volume of conductive resin. For example, conductors and yarns available from Nanocomp Technologies, Inc., Merrimack, N.H. may be used in the improved composite stiffener 48. The integral conductive element 50 may be located only in a portion of the improved composite stiffener 48 as shown in the drawings, or it may be present throughout the entire improved composite stiffener 48. Therefore, it should be compatible with the surrounding materials and should be resistant to corrosion. The integral conductive element 50 is integrated into the improved composite stiffener 48 to have a cross-sectional area in the range of about 0.001 to about 0.66 square inch, which correlates to wire sizes between about 24 to 40 gauge. If necessary, the integral conductive element 50 can be accommodated with material isolation, using fiberglass or another similar barrier layer.

The improved composite stiffener 48 may be formed to have any cross-sectional shape with lower flanges 34 joined to the external skin 32 of the composite structure in accordance with known compositing methods. In the embodiments shown in FIGS. 3 and 4A-4C, the improved composite stiffener 48 has a blade cross-sectional shape with a bead 62 in a terminal portion 58 of the cross-sectional shape where the integral conductive element 50 is integrated into the improved composite stiffener 48. The bead 62 may have any shape including, for example, round, oval, square, rectangular, or other irregular shapes depending on the particular application. Typically the shape is determined by the optimal structural configuration, resistant to column buckling, or torsion, or attachment to the external skin 32. Manufacturing efficiencies are also considered when selecting a shape, such as commonality and complexity. One or more noodles 64 may also be integrated into any gaps formed in the improved composite stiffener 48 during the manufacturing process to provide additional structural stability.

Figure 4A:
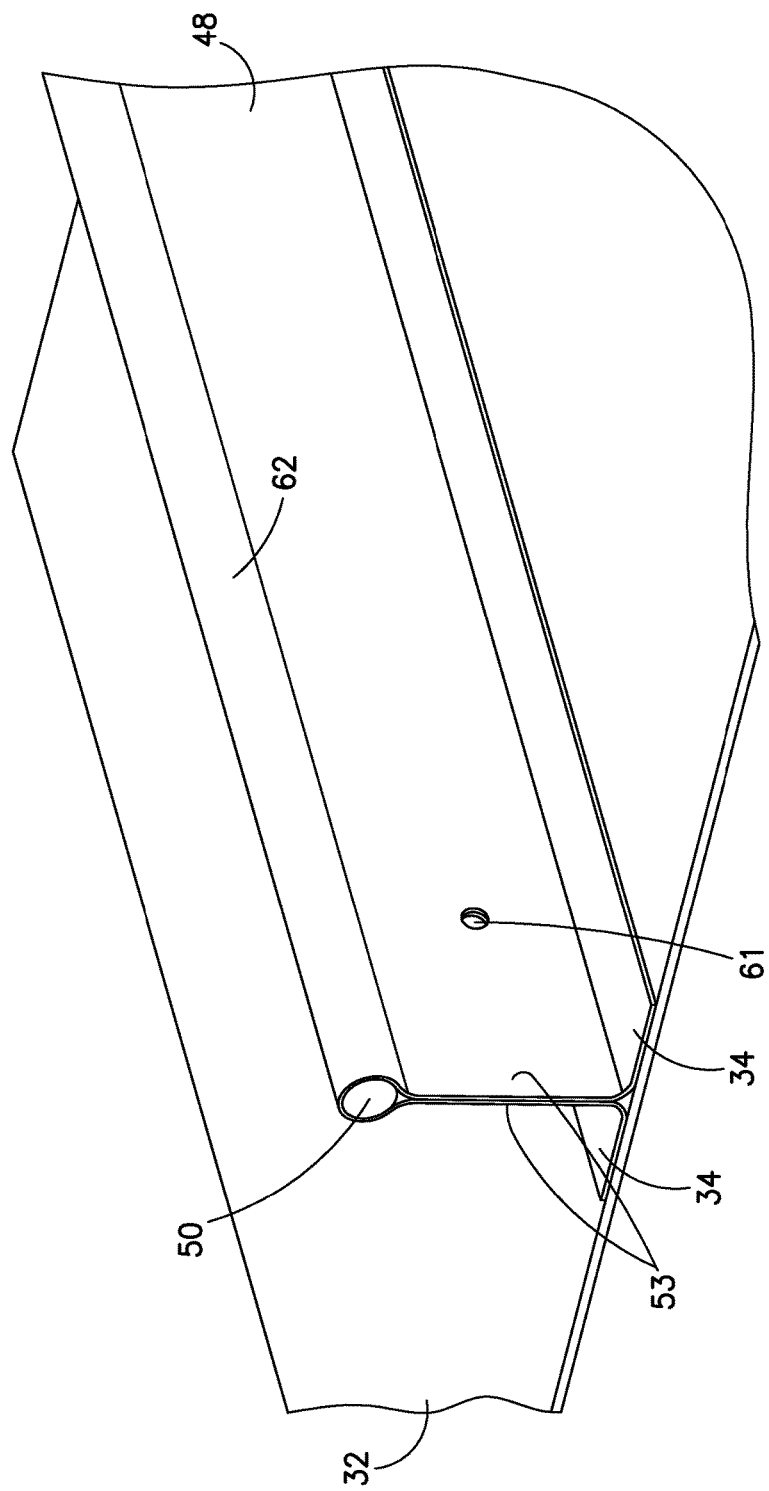
FIG. 4A is an illustration of a perspective view of another embodiment of an improved composite stiffener with integral conductive element and a terminal tab.
Figure 4C:
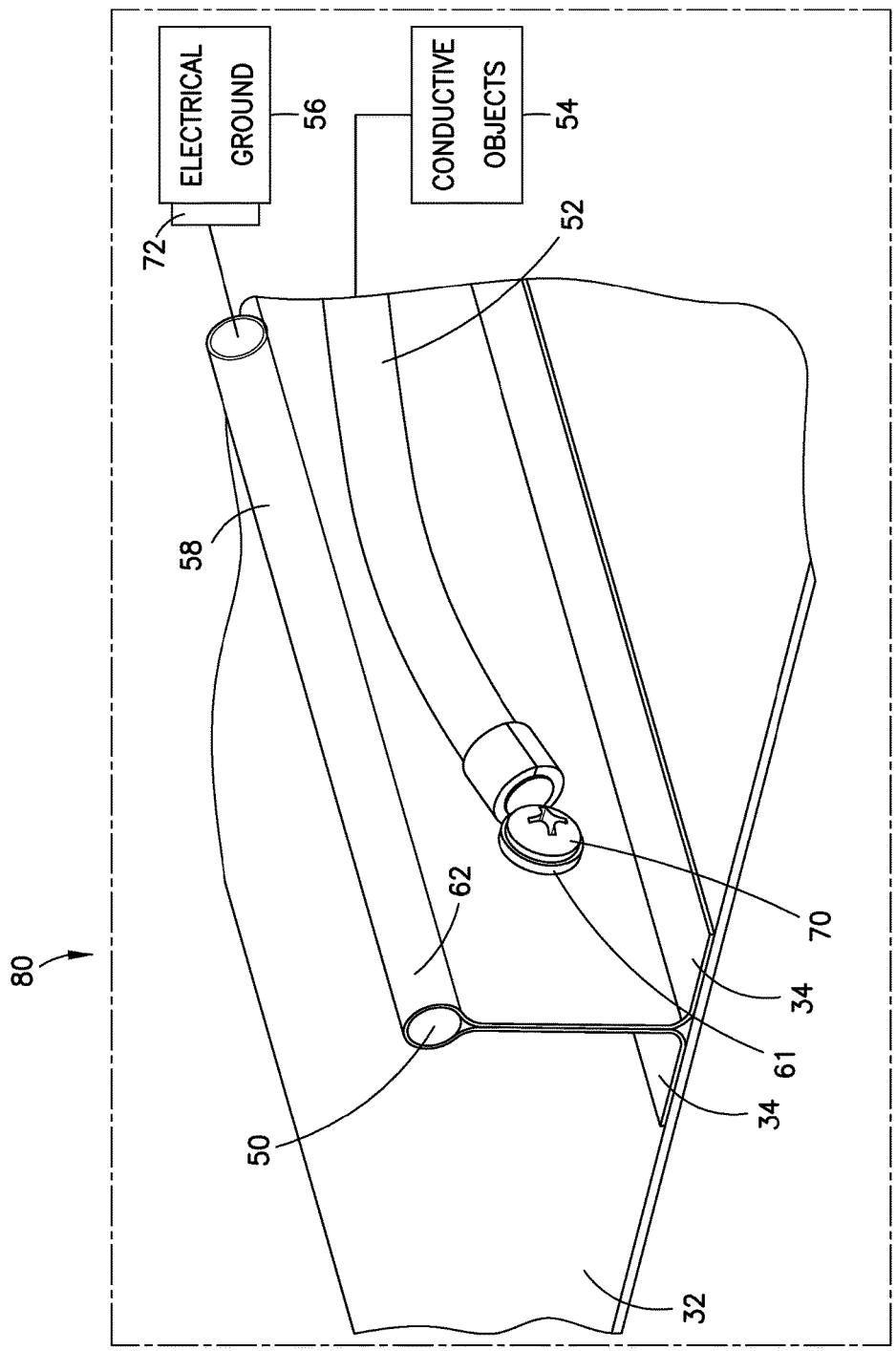
FIG. 4C is an illustration of a perspective view of the improved composite stiffener shown in FIG. 4A coupled to a conductive wire of an electrical ground/return system.
Figure 5:
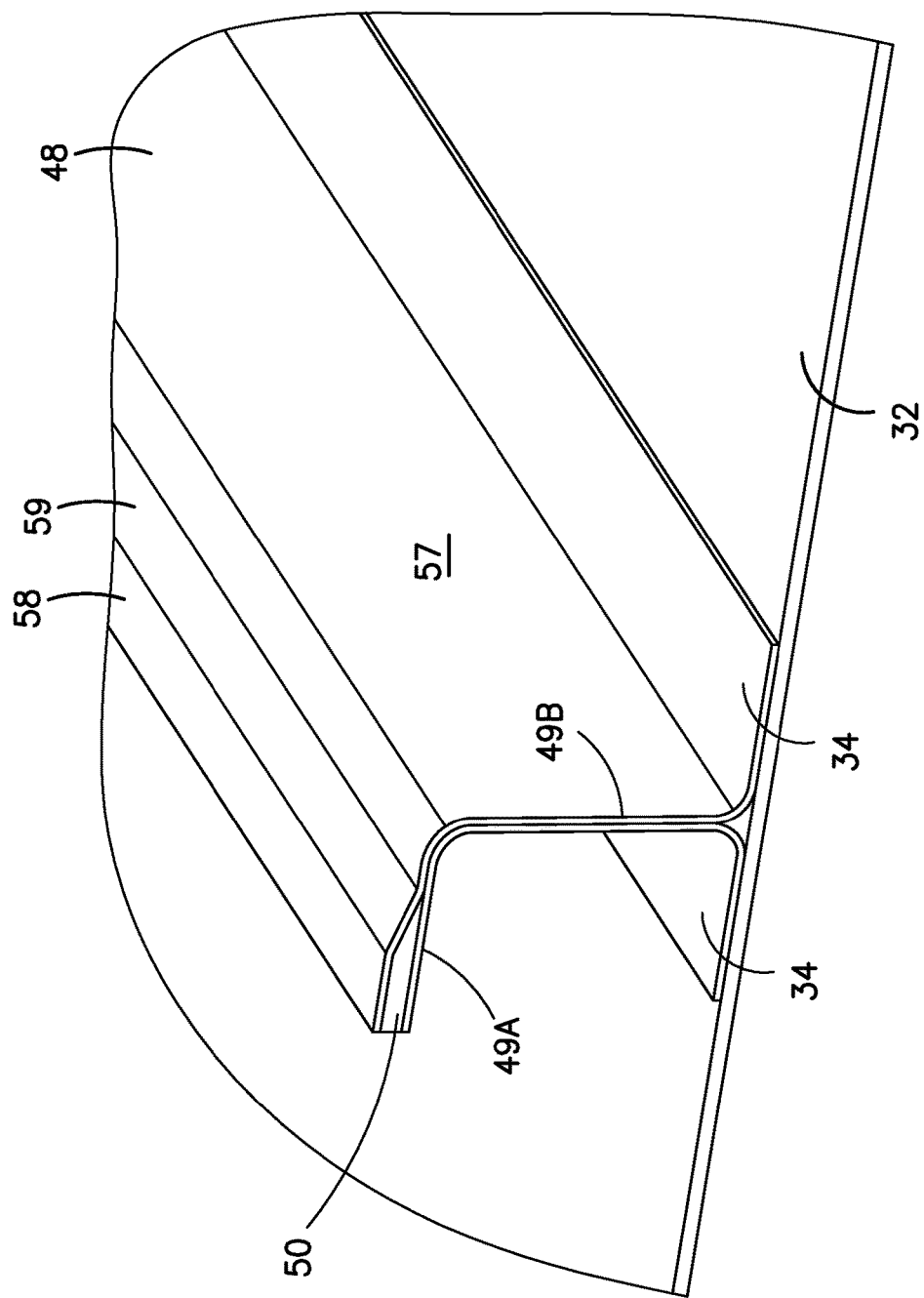
FIG. 5 is an illustration of a perspective view of another embodiment of an improved composite stiffener with integral conductive element having a J-shaped cross-section.

FIG. 5 shows another embodiment of an improved composite stiffener 48 having a J-shape cross-section with the integral conductive element 50 integrated into a generally horizontally oriented terminal portion 58 of the improved composite stiffener 48. This embodiment is configured with two adjacent composite layers 49A and 49B that form opposing lower flanges 34 joined to the external skin 32, a vertical section 57, and the generally horizontally oriented terminal portion 58 where the two adjacent composite layers 49A and 49B are separated to accommodate the conductive element 50. The top layer 49B of the two adjacent composite layers 49A and 49B may be sloped upward to create the separation, or may be sloped during the manufacturing process due to the shape of the integral conductive element 50 to create a tapered edge 59 and provide a smooth transition. In this embodiment, the conductive element 50 does not require a terminal tab 60, and may be coupled to small gauge wires or cables 44 or to the electrical ground 56 anywhere along the length of the conductive element 50 using a nut 70 and bolt similar to that shown in FIG. 4C, but positioned through the horizontally oriented terminal portion 58.

Figure 6:
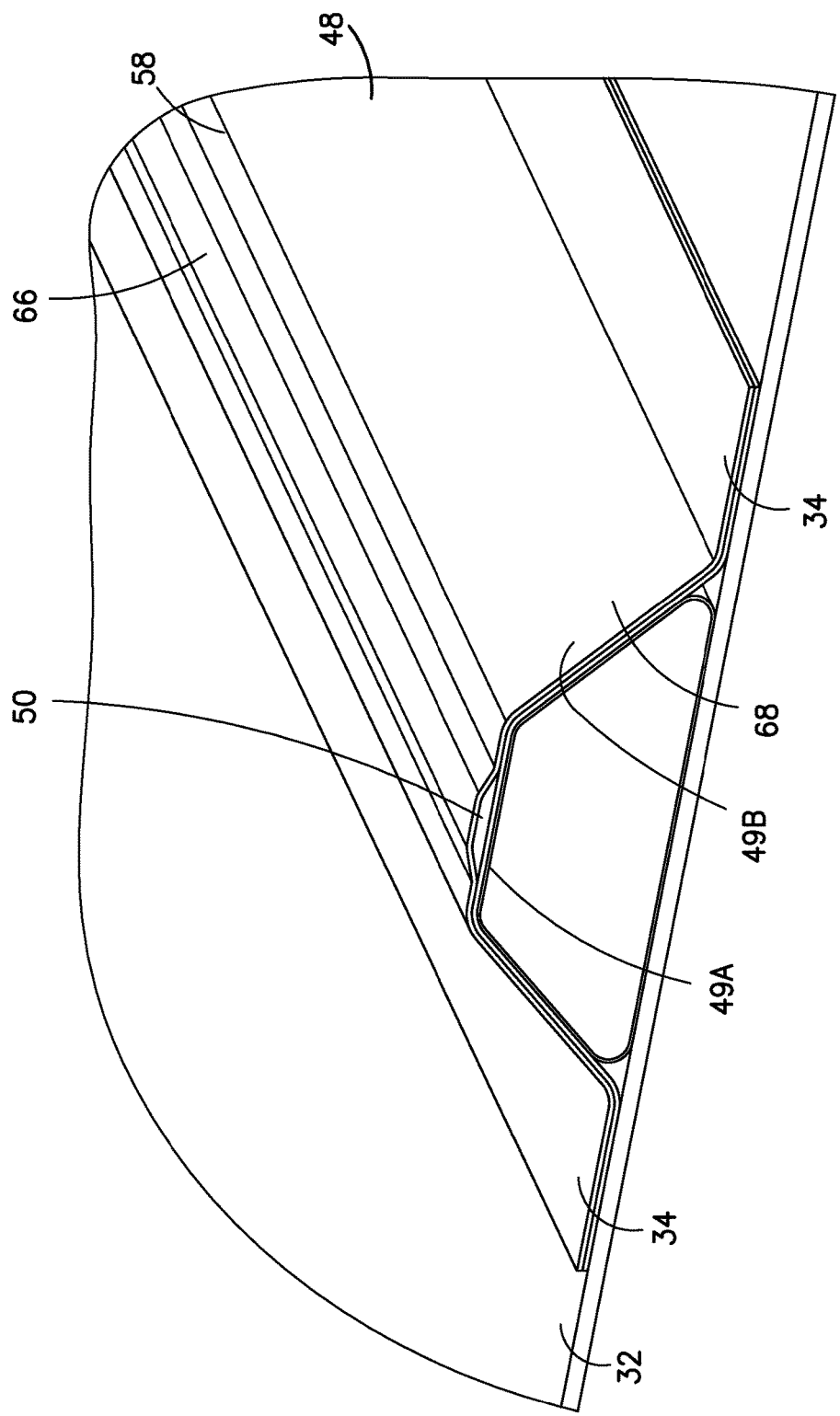
FIG. 6 is an illustration of a perspective view of a further embodiment of an improved composite stiffener with integral conductive element having a hat-shaped cross-section.

FIG. 6 shows an improved composite stiffener 48 having a hat-shape cross-section with the integral conductive element 50 integrated into a cap 66 at the terminal portion 58 of the hat-shape cross-section. Lower flanges 34 are joined to the external skin 32. The cap 66 is a raised portion projecting away from the external skin 32, with angled side walls 68 connecting the cap 66 to the lower flanges 34. In this embodiment, the conductive element 50 does not require a terminal tab 60, and may be coupled to small gauge wires or cables 44 or to the electrical ground 56 anywhere along the length of the conductive element 50 similar to the coupling described above for the embodiments shown in FIGS. 4A-C and FIG. 5. The conductive element 50 in an improved composite stiffener 48 having an I-shape cross-section can be formed in a position similar to the hat-shape cross section shown in FIG. 6 or similar to the J-shape cross-section shown in FIG. 5 between the two adjacent composite layers 49A and 49B.

Figure 7:
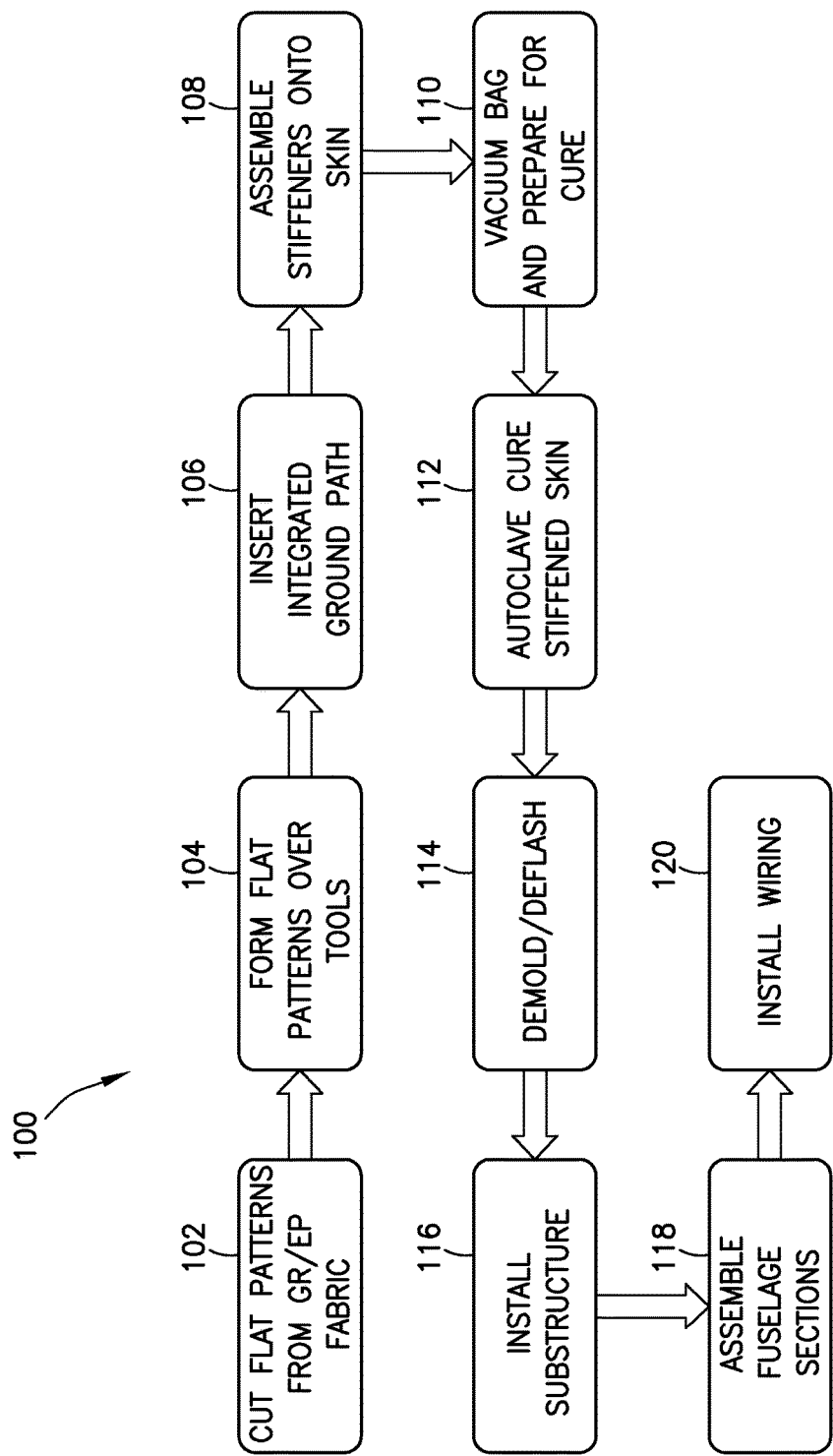
FIG. 7 is a flow diagram of a method of making an aircraft with an improved ground return network system.

A method 100 of configuring a ground/return system in a composite structure comprising conductive objects is shown in FIG. 7. In step 102 of the method 100, flat patterns are cut from a composite material, such as a graphite-epoxy (GR/EP) fabric, in accordance with known methods. Any composite material suitable for the desired application may be used. The pattern is selected based on the desired cross-sectional shape of the improved composite stiffener 48. In step 104 of the method 100, the flat patterns are formed over patterning tools in accordance with known methodologies and equipment to form shaped patterns configured with the desired cross-sectional shape. The conductive element 50 is inserted or integrated between layers of the shaped patterns in step 106 as part of a lay-up process or other layering method at an appropriate position depending upon the desired cross-sectional shape of the improved composite stiffener 48. Noodles 64 may be inserted into any voids or gaps in the composite material to realize additional structural benefits. In steps 108-114, the shaped patterns with the integrated conductive element 50 are assembled onto an external skin 32, the combination is then placed into a vacuum bag, cured in an autoclave, and demolded and deflashed in accordance with known methodologies to form the improved composite stiffener 48. In an alternative method, the shaped patterns with integrated conductive element 50 may be cured independently and then co-bonded on an uncured external skin 32 with an adhesive in between, or bonded to a cured external skin 32 with an adhesive in between. In steps 116-118, the improved composite stiffener 48 may then be installed into a substructure such as section 26 of the airframe 28, and multiple sections 26 are assembled to form the airframe 28. Finally, in step 120, the small gauge electrical wires 52 are used to connect conductive objects to the conductive element 50 in the improved composite stiffener 48 and the conductive element 50 is connected to the electrical ground 56 to form the ground/return system. The electrical ground 56 may be connected to the conductive element in many ways. For example, a ring terminal 72 as shown in FIG. 4C may be used. Alternatives would include a connector with one side permanently fixed to the improved composite stiffener 48 and the other side secured upon installation, with moisture and vibration protection, such that it could be removed when required for maintenance or replacement.

While the invention has been described with reference to certain exemplary embodiments, such embodiments are for purposes of illustration and not limitation. It will be understood by those skilled in the art that various changes may be made and equivalents may be substituted for elements thereof without departing from the scope of the invention. For example, the integral conductive element 50 may be incorporated into any composite component part that provides structural stability to a composite structure, such as frame members 40, to provide an electrical path through the composite part. In addition, many modifications may be made to adapt a particular situation to the teachings herein without departing from the essential scope thereof. Therefore it is intended that the claims not be limited to the particular embodiments disclosed. The method claims set forth hereinafter should not be construed to require that the steps recited therein be performed in alphabetical order or in the order in which they are recited, and should not be construed to exclude two or more steps being performed contemporaneously during at least a portion of the duration of one of said steps.

The invention claimed is:

1. An electrical ground/return system in a composite structure comprising a series of spaced composite stiffeners, the electrical ground/return system comprising small gauge electrical wires coupled to conductive objects throughout the composite structure, an electrical ground in the composite structure, and an integral conductive element disposed in a terminal portion of and extending longitudinally through an entire length of at least one of the composite stiffeners such that a portion of the integral conductive element is exposed at a terminal end of the at least one of the composite stiffeners for connecting the small gauge electrical wires to the electrical ground anywhere along the length of the at least one of the composite stiffeners, the integral conductive element comprising a strength in the range of 80 to 200 ksi.

2. The ground/return system of claim 1, wherein the composite stiffeners have a J-shape cross-sectional shape.

3. The ground/return system of claim 1, wherein the integral conductive element comprises graphite nanotube filaments, carbon nanofibers or nanoparticles, or a metallic filler material.

4. The ground return system of claim 3, wherein the conductive element has a cross-sectional area in the range of 0.001 to 0.66 square inch.

5. The ground/return system of claim 1, wherein the small gauge electrical wires and the electrical ground are coupled directly to the integral conductive element.

6. An aircraft comprising a fuselage having one or more external composite skins, a series of longitudinally spaced circumferential frame members that define a cross-sectional shape of the fuselage, and a series of spaced composite stiffeners disposed longitudinally with respect to the fuselage that together with the frame members support the skins, the aircraft further comprising an electrical ground/return system comprising small gauge electrical wires coupled to conductive objects throughout the aircraft, an electrical ground, and an integral conductive element disposed in a terminal portion of and extending longitudinally through an entire length of at least one of the composite stiffeners such that a portion of the integral conductive element is exposed at a terminal end of the at least one of the composite stiffeners for connecting the small gauge electrical wires to the electrical ground anywhere along the length of the at least one of the composite stiffeners, the integral conductive element comprising graphite nanotube filaments, carbon nanofibers or nanoparticles, and having a strength in the range of 80 to 200 ksi.

7. The aircraft of claim 6, wherein the integral conductive element provides both structural strength and conductivity.

8. The aircraft of claim 6, wherein the conductive element has a cross-sectional area in the range of 0.001 to 0.66 square inch.

9. The ground/return system of claim 6, wherein the small gauge electrical wires and the electrical ground are coupled directly to the integral conductive element.

* * * * *